March 12, 1940.  G. T. RANDOL  2,193,432
CONTROL MECHANISM FOR CHANGE SPEED TRANSMISSIONS
Filed June 4, 1936  6 Sheets-Sheet 2

INVENTOR
G. T. Randol.
BY
P. H. Lamphere
ATTORNEY

INVENTOR
G. T. Randol.
BY
ATTORNEY

Patented Mar. 12, 1940

2,193,432

UNITED STATES PATENT OFFICE 2,193,432

CONTROL MECHANISM FOR CHANGE SPEED TRANSMISSIONS

Glenn T. Randol, Cape Girardeau, Mo., assignor to The Randol Corporation, St. Louis, Mo., a corporation of Missouri Application June 4, 1936, Serial No. 83,458

29 Claims. (Cl. 74—334)

This invention relates to an improved power-operated control mechanism for a change speed transmission of the general character disclosed in my co-pending application filed August 12, 1935, Serial No. 35,891, and now Patent No. 2,071,359, issued February 23, 1937.

One of the objects of this invention is to provide a combination valve and lock mechanism in association with control mechanism of the type referred to which will, when a position of the transmission, as for example neutral, is preselected and the shifting mechanism actuated, function to render inoperative the power means and to simultaneously and positively lock the control mechanism in the preselected position, thereby eliminating the need for conventional spring pressed detents to hold the speed ratio shifting elements in said position.

Another and important object is to provide a change speed transmission control mechanism of the type in which the speed ratios are selected manually and then rendered operative by the movement of the clutch with means for preventing either neutral or an operative speed ratio from being disturbed by movement of the clutch pedal as long as the manual selector remains in a position indicating the condition of the transmission.

Another object is to provide a locking mechanism for positively locking the control mechanism in predetermined position and preventing the power-operated shifting mechanism from being effective to operate the control mechanism, notwithstanding the clutch pedal and the associated control valve may be moved to a position to normally cause the power means to function.

Another object of the invention is to provide a mechanism wherein the yieldable plungers for selectively coupling the speed ratio shifting elements to the companion rotatable selectors for movement thereby to engage a selected speed ratio will also function to positively lock said shifting elements when moved to the speed ratio active position so that the transmission driving connection thus established will remain undisturbed upon subsequent actuation of the clutch pedal or other controlling element until another speed ratio selection is made through the hand-controlled mechanism, so that the energy required to shift the different speed gears or clutches from active position to neutral position will not be dissipated through overcoming resistance set up by the conventional spring pressed detents for holding the speed gears or clutches in their various operative positions.

Still another object of the invention is to provide a power-operated control mechanism wherein the piston of the power cylinder will be in a central position when the change speed transmission is in neutral and the initial stroke of the power cylinder piston from its central position to cause a selected gear ratio to be active will always be in the same direction, and thereafter the full stroke of said piston will be utilized to first neutralize a previously active speed ratio and then cause a selected future speed ratio to become active, such full stroke of the piston continuing until the control mechanism is set for neutral wherein the piston will again assume its central position in readiness to repeat the cycle.

Another object of the invention is to provide a control mechanism of the type referred to wherein the control handle cannot be manipulated into the neutral position with the clutch engaged and a speed gear active, such manipulation requiring that the clutch pedal be fully depressed with the transmission neutralized, and wherein coincidental with the neutral setting of the control handle, as above indicated, the entire mechanism will be positively locked against further actuation until a speed gear is again selected, without hampering the free actuation of the said clutch pedal and without restricting the ability to preselect a future gear.

The invention seeks, as a still further object, to provide a control mechanism for a change speed transmission wherein the control handle cannot be set in the neutral position until the transmission is in neutral condition, thereby eliminating the uncertainty of a preselective neutral setting as well as the likelihood of injury to person or property when re-engaging the clutch in taking leave from the car.

Another object is to provide a power cylinder and a control valve therefor for causing the speed ratios of the transmission to be active and neutral wherein the control valve moves positively with the clutch pedal of the vehicle and causes the piston movement of the power cylinder to be coordinated with the clutch pedal movement in such a manner that the last portion of the disengaging movement of the clutch pedal will cause the piston to move in one direction to neutralize an active speed ratio and the backward or engaging throw of the clutch pedal will cause the piston to move in the opposite direction to render active a selected speed ratio prior to engagement of the clutch.

Other objects of the invention not specifically mentioned will appear from the following description taken in connection with the accompanying drawings which form part of this application.

In order to bring out the function and operation of the present improvements, it has been necessary to illustrate a considerable portion of the structure shown in my prior application above referred to. However, since such structure is described in detail in said application, it is believed only necessary to generally describe such of the present showing that is identical with that of the prior application.

Referring to the drawings, the numeral 1 indicates a casing which is provided with a flange portion 2 for securing it to the top of the usual change speed gear housing 3 by means of four bolts indicated at 4. This casing member and the control mechanism contained therein, to be presently described, are adapted to replace the conventional transmission housing cover that carries the well known gear shifting lever.

The front and rear end walls of the casing 1 are adapted to have mounted therein removable rods 5 and 6 positioned in spaced parallel relation. These rods are prevented from both longitudinal and rotative movement by means of a locking plate 7 detachably secured to the front end of the casing and extending into cross grooves in the ends of the rods. The rod 5 has slidably mounted thereon a gear shifting fork 8 which in the present embodiment is adapted to move either the shiftable gear or the shiftable clutch member for controlling the reverse speed ratio and the low speed ratio of the change speed gearing enclosed in the transmission housing 3. The rod 6 has slidably mounted thereon a shifting fork 9 which is adapted to control either the sliding gear or clutch member for determining the second and high speed ratios of the change speed gearing.

Figure 4:
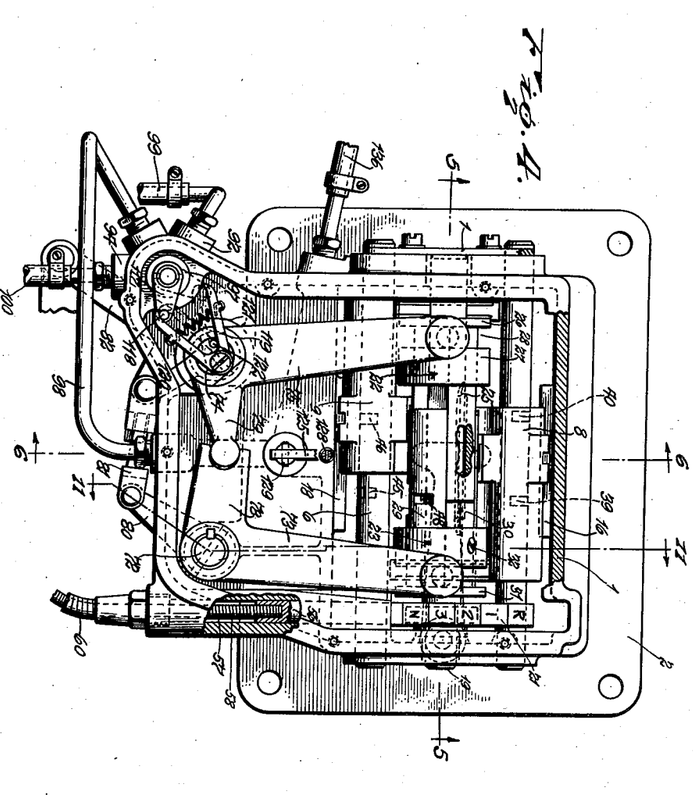
Figure 4 is a plan view similar to Figure 1 but showing the control mechanism in a position wherein the high speed gear ratio is active.
Figures 5, 7, 8:
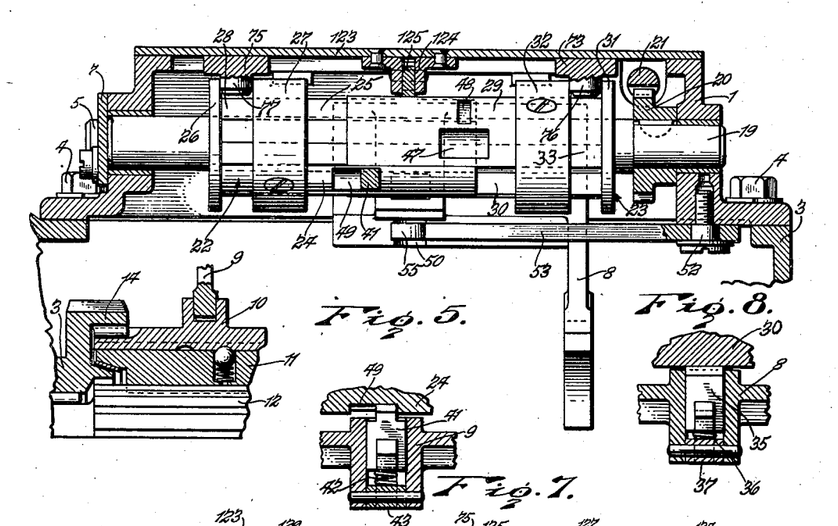
Figure 5 is a cross-sectional view taken on the line 5—5 of Figure 4.
Figure 7 is a cross-sectional view taken on the line 7—7 of Figure 6.
Figure 8 is a cross-sectional view taken on the line 8—8 of Figure 6.

In order to more clearly show how the shifting forks cooperate with the change speed gearing, I have shown in Figure 5 the shifting fork 9 and its relation to a portion of a well known type of change speed gearing which comprises a slideable clutch element 10 splined upon a synchronizing member 11 which in turn is splined upon the driven shaft 12 of the gearing. This driven shaft is piloted in the driving shaft 13 of the gearing which carries the gear 14 for driving the countershaft, as is well known. The clutch element 10 is shown as having its forward teeth in engagement with teeth on the driving shaft 13 thereby placing the change speed gearing in its high speed ratio condition, conforming with the position of the parts of the control mechanism shown in Figure 4. The gearing for the second, low, and reverse speeds is not shown as it is conventional and believed to be unnecessary to bring out the operation of the control means.

Figures 6, 9, 10:
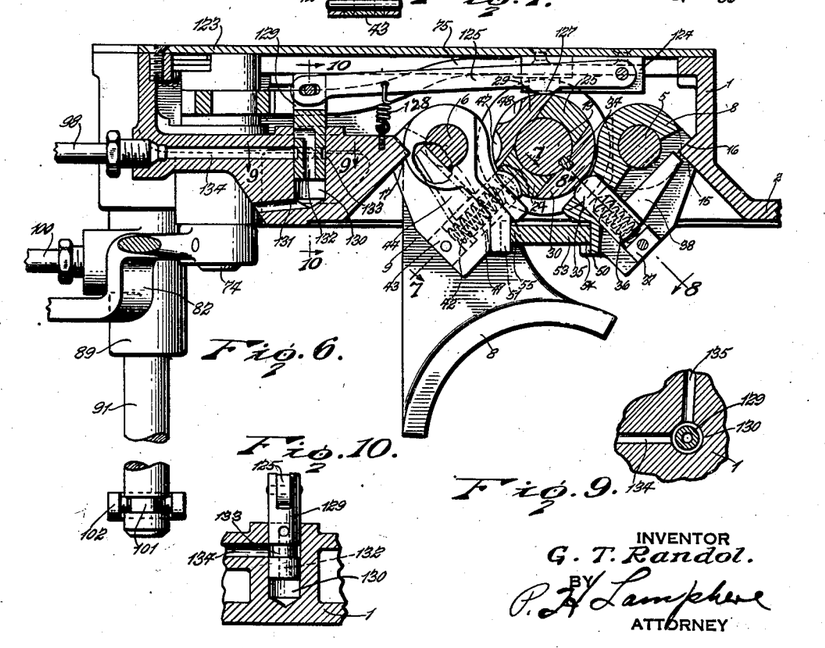
Figure 6 is a cross-sectional view taken on the line 6—6 of Figure 4 and particularly showing my novel locking means for the gear shifting forks and also the shut-off valve.
Figures 9 and 10 are cross-sectional views taken on the lines 9—9 and 10—10 of Figure 6 and relating particularly to the shut-off valve.
Figure 11:
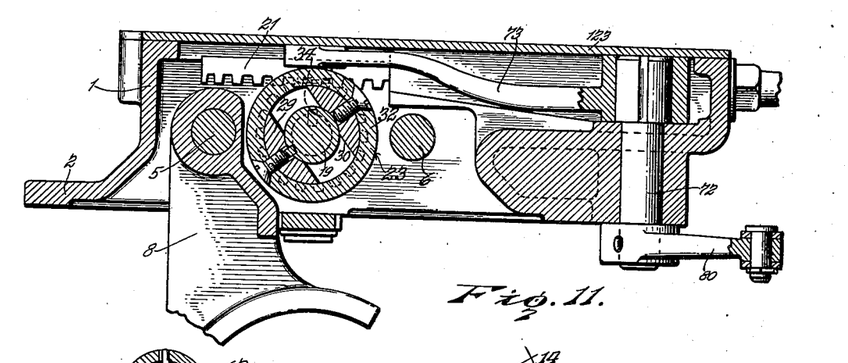
Figure 11 is a cross-sectional view taken on the line 11—11 of Figure 4.

As best shown in Figure 6, the hub of the gear shifting fork 8 is provided with a V-shaped longitudinal groove 15 which is adapted to receive the correspondingly shaped guiding portion 16 integral with the casing 1. The hub of the shifting fork 9 is also provided with a longitudinal V-shaped groove 17 which receives the guiding portion 18 integral with the casing 1. This cooperative relationship between the hubs of the shifting forks and the casing prevents relative rotative movement between the shifting forks and the rods upon which they are slidable, while at the same time it permits the shifting forks to be easily slid back and forth upon the rods.

Positioned between the two rods 5 and 6 and carried by the ends of the casing 1 is a rotatable shaft 19 which is limited against forward movement by the end plate 7 and against rearward movement by a gear 20 secured thereto inside the casing and adjacent the rear end wall. This gear is adapted to co-operate with a slidable rack 21 carried by the upper portion of the casing 1 and extends at right angles to the axis of the rotatable shaft 19 whereby the rotatable shaft may be rotated as desired by a longitudinal movement of the rack. The rotatable shaft 19 has slidably and rotatably mounted thereon a pair of companion selecting and shifting members 22 and 23. The selector member 22 comprises a pair of sector shaped fingers 24 and 25 connected together by an end ring 26 and also having a collar 27 cooperating with the end ring to provide an annular groove 28 adjacent the outer end of the selector. The selector member 23 is substantially a counterpart of the selector 22 and comprises a pair of sector shaped fingers 29 and 30, which are adapted to inter-engage with the fingers 24 and 25 of the selector 22, as readily seen from Figures 4, 5, 6 and 11. The fingers 29 and 30 are connected at their outer ends by an end ring 31 and there is also provided a collar 32 for forming an annular groove 33 in the selector 23 in the same manner as already described in respect to the selector 22. The inter-engaging fingers on the two selectors provide a cylindrical surface and they are prevented from rotating relatively to the shaft by means of a key 34.

Referring to Figures 6, 7 and 8, an important feature of my invention will be described. The hub of the shifter fork 8 is slotted on its lower side and slidable in said slot is a detent 35 biased by means of a spring 36 into engagement with the cylindrical surface formed by the fingers of the two selectors 22 and 23. The slot at the rear of the spring is closed by means of a suitable plug 37 held in position by a pin. The rectangular headed detent 35 carries an integral arm 38 which extends up into the slot adjacent the rod 5 and is adapted to cooperate with either of the slots 39 or 40 in the rod, depending upon the position of the shifter fork. The hub of the shifter fork 9 is also provided with a slot in its lower side and positioned in this slot is a rectangular headed detent 41 biased by means of a spring 42 into engagement with the cylindrical surface formed by the fingers of the selectors 22 and 23. The slot at the rear of the spring is closed by means of a plug 43 held in the slot by a suitable pin. The detent 41 carries an integral arm 44 lying in the slot and extending adjacent the rod 6 for cooperation with the slots 45 and 46 in the surface of the rod, depending upon the position of the shifter fork.

Figure 1:
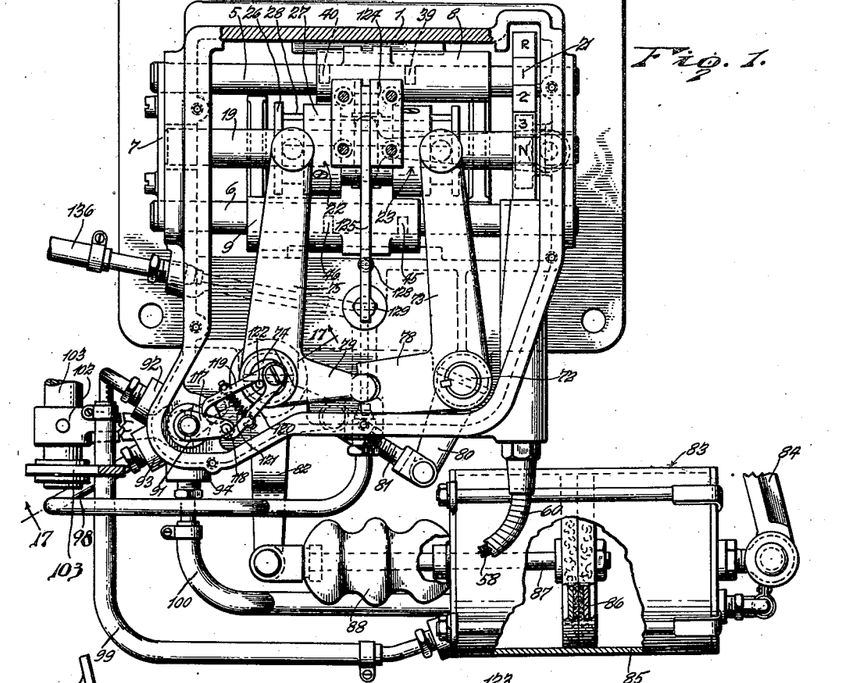
Figure 1 is a plan view showing my improved control mechanism in neutral position, parts being broken away.
Figure 2:
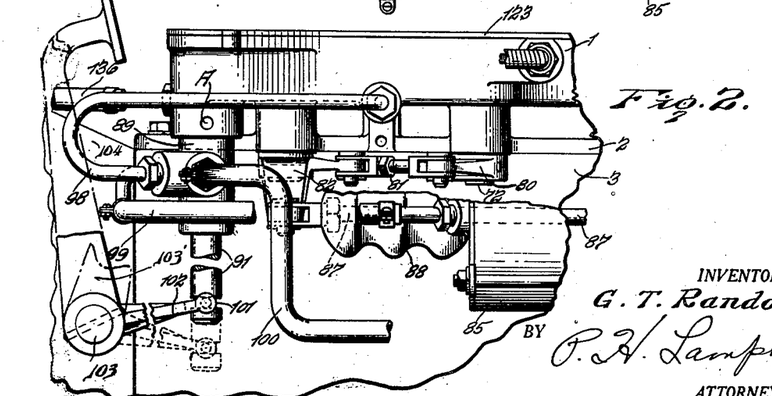
Figure 2 is a partial elevation of the structure of Figure 1 showing my mechanism mounted upon a transmission housing.

The finger 29 of the selector 23 is provided with a somewhat elongated recess 47 and the finger 24 of the selector 22 is provided with a similar elongated recess 49, both of which recesses are adapted to cooperate with and receive either of the detents 35 or 41, depending upon the angular position of the selectors. Attention is also called to the narrow recess 48 in the finger 29, the purpose of which will be later described. It is to be noted, however, that the width of this recess is such that neither of the detents can engage therein. The recesses 47 and 49 and the detents are so positioned and arranged that only one detent can be in one recess at a time. When the selectors are in their innermost axial position, which is the neutral position of the gearing and is shown in Figure 1, the recesses 47 and 49 are in circular alignment. Under these conditions, with the rack 21 in the position marked "N" (Figure 1), neither of the detents will be in a recess as the selectors are in a position 45 degrees clockwise from that shown in Figure 6.

When the rack is slid to the position marked 3, the selectors will be rotated to a position where the detent 41 will engage in the recess 49, this being the position to select third or high speed when the gearing is in neutral. When the rack is slid to the position marked 2, the detent 41 will engage in the recess 47, this being the position of the selectors to select second speed when the gearing is in neutral. When the rack is slid to the position marked 1, the detent 35 will engage in the recess 49 and low speed will be selected. When the rack is moved to the position marked "R", the detent 35 will engage in the recess 47 and reverse will be selected. Thus it is seen that when the selectors are moved away from each other, whichever shifting fork is connected to the finger 24 or 29 will be moved with it and the gear or clutch member connected to the shifter fork moved to an active position. Of course, if neither detent is in a recess, the shifter forks will not be moved.

Figure 3:
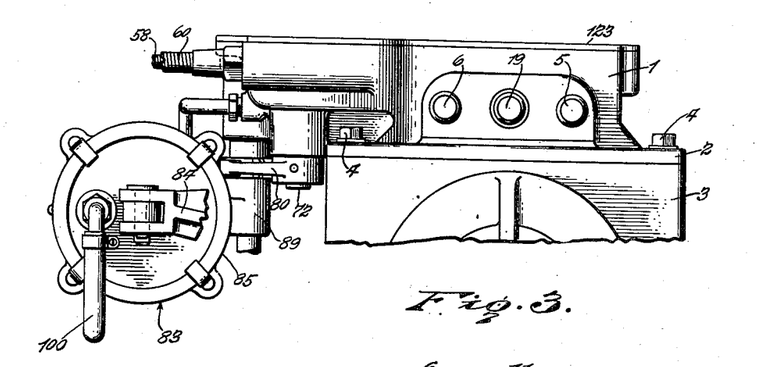
Figure 3 is a rear view of the control mechanism as mounted on the transmission housing.

It is also to be noted that with the structure just described it is not necessary to have the selectors in their innermost or neutral position (Figure 1) in order to select a gear ratio other than the one that is active. The selectors may be rotated when they are in the outermost position, as for example the position shown in Figures 3, 5 or 6 wherein the detent 41 has been engaged in the recess 49 to connect the fork 9 to the finger 24 and the selectors moved apart to cause the third or high speed gear ratio to be active. Rotation of the selectors to any position results in the detent 41 being forced out of the recess 49 and up onto the cylindrical surfaces formed by the fingers. If, for example, second speed should be desired, the detent will ride upon the surface of finger 29 and in longitudinally spaced relation with the recess 47. The ring 27 on the selector 22 and the ring 32 on the selector 23 are of such thickness and width that they will engage the shifter forks and return them to their neutral position and, therefore, when the selectors are moved toward each other, the shifter fork 9 will be returned to neutral by the ring 27. When the neutral position is reached, the detent 41, which has been riding on the surface of the finger 29, will engage in the recess 47 and the second speed shifter fork will be connected to the selector 23 ready to be moved with it to cause the second speed gear or clutch to be active whenever the selectors are again moved apart. If another speed ratio or neutral is not selected by turning the selectors when the selectors are apart and a shifting fork is connected to one of the selectors, then, of course, the shifter fork will not be brought back to the neutral position by the detent connection as the fork will remain locked in its shifted position.

In connection with the slots 47 and 49, it might be here noted that they are of slightly greater length than the width of the detents in order to permit the detents to readily engage in the recesses and to limit the extent of movement of the shifting fork. In other words, if the shifting fork need not be moved as far as the selector is moved, the length of the slot results in the fork not being moved until the selector has been moved the required idle distance.

The arms 38 and 44, carried by the detents, will bear on the cylindrical surface of the rods when the detents are partially engaged in the selector finger recesses as is the case when the shifting forks are in neutral position as shown in Figure 1 and a future gear is selected. Under such conditions, however, the detents are prevented from being pressed to the bottoms of the recesses but they are sufficiently engaged in the recesses to make a good connection between the fork and the selectors for axial movement thereby. However, when the selector moves the shifter fork to a position to engage a gear or a clutch of the change speed gearing, the arm will be pressed into one of the slots in the rod to thereby lock the shifter fork in the shifted position. This is best shown in Figure 6 wherein the detent 41 is in full engagement with the recess 49 and the arm 44 lies in the slot 46, thereby locking the shifter fork in the high speed position shown in Figure 5. The position of the detent 41 and the arm 44 at the time that the detent first engages in the recess 49 and the arm is moved to engage the rod and prior to the movement of the gear shifting fork to its final position is shown in dotted lines.

Still referring to Figures 5 and 6, the shifter fork 8 is also provided with a recess 50 and the shifter fork 9 with a similar recess 51. Pivoted at 52 to the under side of the casing 1 is an interlocking member 53 having a T-shaped head provided with rounded ends 54 and 55. The end 54 is adapted to cooperate with the recess 50 and the end 55 with the recess 51 and the distance between the ends of the T-head is equal to the distance between the shifter forks 8 and 9 plus the depth of one of the recesses. The function of this interlocking member is well known and need not be described in detail. When one of the shifter forks is moved from its neutral position, one end of the T-head of the interlocking member will be forced into the groove in the other shifter fork and held therein to thereby lock the latter shifter fork from any longitudinal movement until the other fork is again returned to neutral position.

Referring to Figures 12 to 16, inclusive, the hand controlled mechanism for rotating the shaft 19, which carries the selecting members and indicates their position, will now be described. The end 56 of the rack 21 (Figure 4), which slides in bore 57 in the casing 1, has connected thereto a flexible cable 58 which extends upwardly and is connected to a control handle 59 suitably mounted in the control compartment of the vehicle. The flexible cable is enclosed within a sheath 60, one end of which is connected to the casing 1 and the other end connected to a tubular casing 61 which surrounds and guides the shaft 62 of the control handle. The connection between the cable 58 and the shaft 62 of the control handle is preferably by means of a ball and socket joint in order to permit slight relative rotation. In the structure illustrated the control handle is adapted to be mounted upon the dashboard of the vehicle and in order to secure this result, the casing 61 is provided with a flange 63 for engagement with the surface of the dashboard 64 when the tubular casing is inserted in a suitable opening in the dashboard. The tubular casing is also provided with external threads for reception of a nut 65 to clamp the flange 63 to the dashboard.

Figures 12, 13, 14, 15, 16:
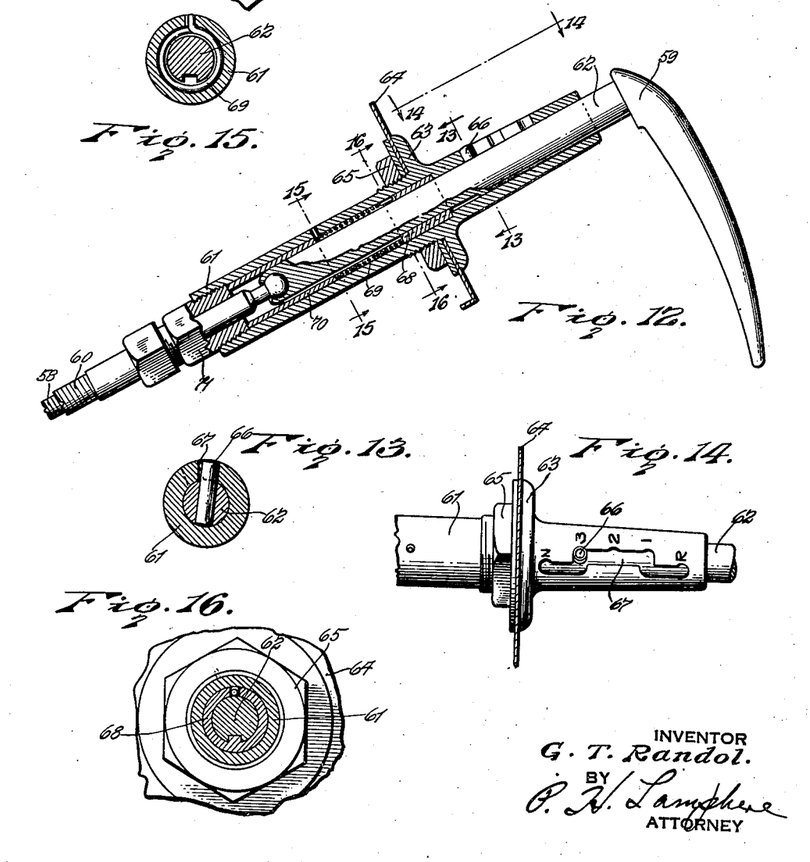
Figure 12 is a partial cross-sectional view of the hand-controlled device for performing the selecting operation.
Figure 13 is a cross-sectional view taken on the line 13—13 of Figure 12.
Figure 14 is a cross-sectional view of the indicator slot as viewed from the line 14—14 of Figure 12.
Figures 15 and 16 are cross-sectional views taken on the lines 15—15 and 16—16, respectively, of Figure 12 showing the manner in which the torsional spring is embodied in the hand control device.

The shaft 62 of the control handle is provided with a pin 66 adapted to slide in an irregular slot 67 in the upper portion of the tubular casing 61 as shown in Figure 14. This slot is provided with a plurality of recesses marked R, 1, 2, 3, and N to indicate the reverse, first speed, second speed, third speed, and neutral positions of the rotatable shaft 19 carrying the selectors. Thus when the pin is in slot 3, for example, the selectors 22 and 23 will be in a position wherein the detent 41 is adapted to engage the recess 49. In order that the pin 66 may be yieldably held in the different recesses, the shaft 62 has splined thereon a collar 68 to which is secured one end of a torsional spring 69 surrounding the shaft 62, the other end of the coiled spring extending through a hole in the casing 61. A sleeve 70 is also provided between the torsional spring and the nut 71 by which the sheath 60 is secured in the end of the tubular casing in order that the shaft 62 may be properly guided and prevented from lateral play. The torsional spring is placed under tension during the assembly of the control handle by rotating the shaft 62 with the pin 66 removed. When the desired tension is secured, the pin is then forced into the hole in the shaft 62.

Referring particularly to Figures 1, 2, 4, 11 and 17 to 22, the means for moving the selectors 22 and 23 simultaneously in opposite directions to shift the selected shifting fork are very similar to the means shown and described in a prior application referred to and will, therefore, not be described in minute detail. The casing 1 is provided with an integral extended portion in which is journaled a shaft 72, having keyed thereto a lever 73, and a shaft 74 having rotatably mounted thereon a lever 75. The free ends of the levers 73 and 75 extend over the selectors and the lever 73 is provided with a stud 76 for engagement with the grooves 33 of the selector 23 and the lever 75 is provided with a similar stud 77 for engagement with the groove 28 of the selector 22. The lever 73 has an integral arm 78 which is adapted to interlockingly coact with an integral arm 79 extending from the lever 75 by a suitable ball and socket connection. The shaft 72, which extends to a point below the extension of the casing, has secured thereto an operating arm 80 which is connected by means of an adjustable link 81 to a lever 82 secured to the portion of the shaft 74 which extends from the bottom of the casing 1. The lever 82, connecting link 81 and arm 80 form a toggle mechanism which will cause the interconnected levers 73 and 75 to be in their innermost position when the link is positioned so that its center line passes through the axis of shaft 74, as shown in Figure 1. Movement of the lever 82 in either direction from the position shown in Figure 1, which will be referred to as the central position of the lever 82, will result in the levers 73 and 75 being moved apart by the action of the toggle.

The lever 82 is adapted to be actuated by a suction motor 83 carried on the transmission housing by means of a suitable bracket 84. The suction motor comprises a cylinder 85 and a reciprocable piston 86 therein which is connected to the lever 82 by means of the piston rod 87. A suitable dust excluding flexible boot 88 is provided between the cylinder and the piston rod as shown. The piston is adapted to be normally positioned at the center of the cylinder when the lever 82 is in the central position and the levers 73 and 75 are at their innermost position as shown in Figure 1.

The main clutch-operated control valve for controlling the suction motor will now be described. The extended portion of the casing 1 in which the levers 73 and 75 are pivoted is so constructed as to form an integral valve casing 89 having a vertical bore 90 for the reception of the valve rod 91. The casing adjacent its central portion is provided with nipples 92, 93 and 94 through which extend ports 95, 96 and 97. The port 96 is adapted to be connected to a conduit 98 which leads through a valve to be later described to a source of power which, in the present instance, is the manifold of the internal combustion engine of the vehicle. The port 95 is connected to a conduit 99, which leads to the forward end of the cylinder 85, and the port 97 is connected to a conduit 100 which leads to the rear of the cylinder 85.

The lower end of the valve rod 91 is provided with an annular groove 101 in which is positioned a forked arm 102 which is secured to the usual clutch pedal shaft 103 extending out of the clutch housing 104 (Figure 2) and carrying the usual clutch pedal 103'. By means of this connection between the clutch shaft and the valve rod, the valve rod may be moved upwardly to the position shown in Figures 2 and 17 when the clutch pedal is moved forwardly to disengage the clutch and to the lower position as indicated in dotted lines in Figure 2 when the clutch pedal is released to permit engagement of the clutch.

Figures 17, 18, 19, 20, 21, 22, 30:
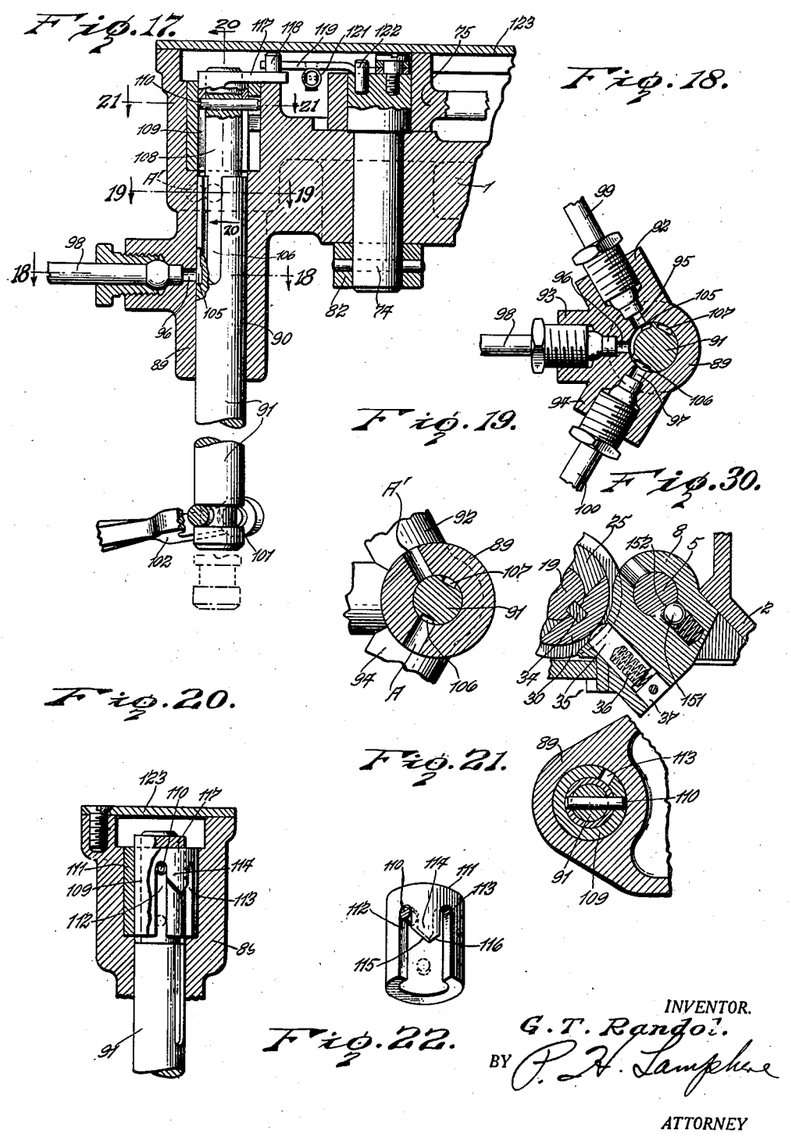
Figure 17 is a cross-sectional view taken on the line 17—17 of Figure 1 and particularly showing the control valve operated by the clutch pedal.
Figures 18, 19, 20, and 21 are views taken on the lines 18—18, 19—19, 20—20 and 21—21 of Figure 17 showing different portions of the control valve.
Figure 22 is a perspective view of the locking control sleeve for the valve rod of the control valve.
Figure 30 is a cross-sectional view showing the type of detent employed between the selector and the shifting fork of the modified structure.

The forward surface of the valve rod is provided with a recess 105 which is of sufficient length to place any two of the adjacent ports 95, 96 and 97 in communication, depending upon the angular position of the valve rod. The length of this recess 105 is best shown in Figure 18 wherein it is in a position to connect the ports 95 and 96. On opposite sides of the recess 105 are longitudinally extending air inlet recesses 106 and 107 which extend upwardly and open into the reduced end 108 of the upper end of the valve rod. The valve casing 89 is provided with suitable air inlet ports A and A' (Figure 19) located above the ports 95 and 97 and adjacent the tops of the recesses 106 and 107, respectively, in order to insure that sufficient air will flow to the ports 95 and 97 when the longitudinal recesses are properly positioned to communicate therewith. The upper end of the valve rod has mounted thereon a slidable sleeve 109 keyed to rotate with the valve rod by means of a pin 110 which extends outwardly from one side of the valve rod and is adapted to cooperate with an M-shaped cut out portion of a sleeve 111. This sleeve 111 has a press fit with the enlarged portion of the upper end of the valve casing and is at all times prevented from any relative movement with respect to the casing.

The M-shaped cut out portion of the sleeve and the manner in which the pin 110 cooperates therewith is another feature of the present invention. The M-shaped cut out portion is formed by parallel slots 112 and 113 and a downwardly extending tongue 114 provided at its lower ends with diverging inclined surfaces 115 and 116, the surface 115 being longer than that indicated at 116 so that the apex of the surfaces is positioned at one side of the central part of the downwardly extending tongue. The upper end of the sleeve 109, which extends into a chamber portion, has integrally fixed thereto an arm 117 carrying an upwardly extending pin 118.

Pivoted at their inner ends upon the upper end of the shaft 74, eccentrically thereof and within the casing 1 is a pair of companion levers 119 and 120 as best shown in Figures 1, 4 and 17. The inner ends of these levers are curved inwardly to coact with the pin 118 on the arm 117 and extending transversely between the levers at approximately their center is a connecting spring 121. Fixed to the shaft 74 forwardly of the pivot of the companion levers is a pin 122 which projects between the inner ends of the levers.

By means of the main control valve structure and associated mechanism, the suction motor is controlled in the manner desired. The valve rod 91, when the clutch pedal is in clutch engaged position, is in its lowermost position as indicated by the dotted lines in Figures 2 and 17. The pin 110, carried by the upper end of the valve rod, lies below the tongue 114 of the fixed sleeve 111 and, if the selectors are in their innermost position, this pin 110 will be so positioned relative to the inclined surface 115 of the tongue 114 that it will be directly below and to the left of the apex of the surfaces 115 and 116. The axial length of the valve recess 105 is approximately the length of travel of the valve rod 91 from the apex of the surfaces 115 and 116 to the upper end of the slots 112 and 113 and when the clutch has been moved to the engaging position, recess 105 will be in a position to cause the source of suction to be shut off by closing port 96 and from this point to the fully engaged clutch position, will be idle during axial travel of valve rod 91. Since the selectors are in their innermost position, the piston of the suction motor will also be in its central position as indicated in Figure 1.

The first movement of the clutch pedal 103' to disengage the clutch will move the valve rod 91 upwardly but due to the distance that the pin 110 lies below the surface 115 of the tongue on the sleeve 111, which determines the idle travel, the pin will not engage the surface until the clutch has been released. Additional movement of the clutch pedal causes the pin 110 to engage the inclined surface 115 whereupon the valve rod will be rotated simultaneously with its upward movement as a result of the pin 110 being guided into the slot 112. This rotation of the valve rod results in the recess 105 being moved to connect the ports 95 and 96 in the valve casing and the longitudinal recess 106 with the port 97 in the valve casing. Consequently, the forward end of the suction motor will be connected to the source of suction by means of the conduits 99 and 98 and the rear end of the suction motor will be connected to atmosphere by means of the conduit 100.

The piston 86 will now be moved to the left and as a result thereof, the levers 73 and 75 will be moved apart to separate the selectors in a manner already described. The rotation of the shaft 74 by the suction motor causes the lever 119 of the companion levers to be moved in a clockwise direction by means of the pin 122, as viewed in Figure 4, thereby tensioning the spring 121 which is interposed between the companion levers.

When the clutch pedal 103' is released to engage the clutch, the first movement of the clutch pedal results in the valve rod 91 being lowered and as soon as it reaches the position wherein the pin 110 will be free of the slot 112 in the sleeve 111, the valve rod will be rotated to a position where the pin will lie below the slot 113 as the result of the action of the lever 120 being rotated in a clockwise direction by the spring 121. The valve rod is now in a position where the longitudinal recess 107 registers with the port 95, thereby causing air to be admitted to the forward end of the suction motor through conduit 99. The rear end of the cylinder will not be connected to the suction under these conditions since the recess 105 lies below ports 96 and 97.

When it is again desired to make a shift, the clutch pedal is depressed, thereby disengaging the clutch and moving the valve rod 91 upwardly. Since pin 110, under these circumstances, lies directly below slot 113 in sleeve 111, there will be no rotative movement of the valve rod. When the valve rod has reached its uppermost position, the recess 105 will register with ports 96 and 97 and the longitudinal recess 107 will continue to register with port 95. This position of the valve rod results in the rear end of the suction motor being connected to the source of suction through conduits 100 and 98 and the forward end of the suction motor in communication with the atmosphere through conduit 99. The piston of the suction motor will now be moved to the extreme rear end, thereby making a complete stroke and consequently first moving the levers 73 and 75 inwardly to disengage an active gear, if one is active, and picking up a selected gear and then moving outwardly to separate the selectors and render active the gear which is selected. During this operation pin 122 on shaft 74 is moved in a counter-clockwise direction, as viewed from the top, and carries with it lever 120, thereby tensioning spring 121, lever 119 remaining behind lever 120 as a result of its engagement with pin 118 on arm 117 which is in the position indicated by dotted lines in Figure 4.

When the clutch pedal is released and the valve rod is turned clockwise, as viewed from the top, and to a position where pin 110 is directly below slot 112. The lowering of the valve rod also results in the disconnection of the suction from the rear end of the suction motor by the movement of the recess 105 of the valve and also the admitting of air to the rear end of the valve by the registration of the longitudinal recess 106 with port 97. The valve rod is now in a position where a subsequent disengagement of the clutch by the movement of the clutch pedal will move the valve rod upwardly and cause the front end of the cylinder to be connected to the source of suction and the rear end of the suction motor to remain in communication with the atmosphere, whereby the piston of the suction motor will move through a full stroke to the forward end of the suction motor to again move levers 73 and 75 first toward each other and then away from each other to neutralize the active speed and render active a speed which has been selected, if such is the case.

The cycle just described will be completed as often as found desirable and whenever the clutch pedal is depressed, the piston of the suction motor completing a full stroke each time the pedal is depressed.

Referring particularly to Figures 1, 5, 7, 10 and 11, the novel means for preventing the operation of the suction motor when the selectors 22 and 23 are in predetermined positions, regardless of the movement of the clutch-operated control valve rod 91, will now be described. My novel means also is so arranged that the selectors will be positively locked in the predetermined position and will remain so until the selectors are rotated to a new position. I have chosen to show my novel means as being operative when the selectors are moved to their innermost position by the levers 73 and 75 and rotated to neutral or N position by the control handle, although it is to be understood that my means may be employed to be operated when the selectors are in other positions by the proper relationship of the parts if such is found desirable.

As already pointed out, finger 29 on the selector member 23 is provided with a narrow recess 48 which is not engaged by either of the detents 35 or 41. This recess, when the selectors are in neutral or N position, will be at the top of the cylindrical surface formed by the selector fingers. The casing 1 is provided with a suitable removable cover plate 123 for enclosing all the parts and pivoted to a suitable bracket 124 carried by the under side of the cover is a lever 125 extending across the top of the selectors. The under side of this lever has formed thereon a rounded projection 127 adapted to fit into the recess 48 in the selector finger 29 when it is in register beneath it. When the recess 48 is not beneath the projection, it rides on the cylindrical surface formed by the fingers of the selectors. It will not engage in either of the recesses 47 or 49 since, as readily seen in Figure 6, these recesses never assume a top position when moved by the control handle. Lever 125 is biased into engagement with the selectors by a suitable spring 128.

The free end of the lever is connected to the movable element 129 of a shut-off valve. The element 129 is slidable in a bore 130 in the casing 1 between levers 73 and 75 and the lower end of this bore is connected to atmosphere by a passage 131. The element 129 is formed with a central passage 132 which extends to the surface thereof and also an annular groove 133. Extending into bore 130 is a passage 134 in the casing 1 which is connected to the conduit 98 leading from the tubular valve casing 89 and already referred to as being connected to conduit 136 leading to the manifold of the internal combustion engine which furnishes power for the vehicle through the change speed transmission that is to be controlled.

When the projection 127 of lever 125 rides on the cylindrical surface formed by the fingers of the selectors, the valve element 129 of the shut-off valve will be in its uppermost position as shown in Figures 6 and 10. Under these conditions the annular groove 133 will be in a position to place passages 134 and 135 in communication and conduit 98 leading to the main control valve will be in direct communication with the source of suction. When the selectors are brought to their innermost position and the control handle turned to indicate neutral or N position of the selectors, the recess 48 will be presented to projection 127 of the lever and thereby engage in said recess. The lever will then be pulled down by the spring 128 and as a result the valve element 129 will be lowered. In this lowermost position the annular groove 133 is out of position to place passages 134 and 135 in communication but the surface port of the central passage 132 is in register with passage 134, thereby placing said passage in communication with the atmosphere through passage 131 at the base of the bore 130. Under these circumstances the conduit 98 is no longer connected with the source of suction and, therefore, the suction motor cannot be operated regardless of whether the clutch pedal controlled rod is moved to an operative position by disengaging the clutch.

It is also to be noted that when the projection 127 engages in recess 48, it positively locks the selectors in their inner position and they cannot be moved therefrom until the control handle is moved to rotate the selectors to a different position to free the selectors from the locking effect of projection 127.

If it is desired to have projection 127 effective to lock the selectors in any position besides neutral, the recess 48 may be positioned in the proper place on a finger of one of the selectors so that the projection will enter the recess when the selectors assume the desired position.

Referring now to the complete operation of my control mechanism, it is first assumed that the mechanism is in the position shown in Figure 1 which is the neutral position. Under such conditions the pin of the control handle is in the recess marked "N", the selectors are in their innermost position and the recess 48 is in an upward position receiving the projection 127 on lever 125, thereby closing the shut-off valve and cutting off the suction from the motor. The valve rod 91 is in the lower position and the clutch is engaged. The rotative position of the valve rod is such that pin 110 lies below the inclined surface 115 of sleeve 111 and arm 117 on sleeve 109 is in the position indicated by dotted lines in Figure 1. Any movement of the clutch pedal at this time to disengage the clutch will have no effect upon the suction motor, notwithstanding the fact that the valve is moved to its uppermost position since, as already stated, the shut-off valve is closed.

If it is now desired to cause the first speed ratio of the transmission to be active, the control handle is moved to a position to place pin 66 in the recess marked 1. This causes selectors 22 and 23 to be rotated to a position wherein the recess 49 is engaged by detent 35, thereby connecting the shifter fork 8 to finger 24 of selector 22. The rotation of the selectors also causes projection 127 on lever 125 to ride out of the recess 48 and onto the cylindrical surface of the selectors and thereby move the valve element 129 of the shut-off valve to an open position wherein conduit 98 will be in communication with the manifold of the internal combustion engine. By now depressing the clutch pedal, the clutch will be first disengaged and the valve rod 91 moved upwardly first engaging the inclined surface 115 and then being rotated to a position where pin 110 engages in slot 112 of sleeve 111. As already pointed out, this position of the control rod results in the forward end of the suction motor being placed in communication with the source of suction and the rear end of the suction motor in communication with the atmosphere. The piston of the suction motor is now moved forwardly to the end of the cylinder and consequently the selectors are moved to their outer positions, selector 22 carrying with it the shifter fork 8 and thereby engaging the low speed ratio which is controlled by the said shifter fork.

When the low speed ratio is engaged, the arm 38 will engage in slot 40 of rod 5, thereby positively locking the shifter fork in its shifted position. Simultaneously with the movement of the shifter fork, the interlocking member 53 is moved to engage in recess 51 of the shifter fork 9, thereby locking this shifter fork in its neutral position. Simultaneously with the movement of levers 73 and 75 to the outer position, lever 119 on the end of shaft 74 will be moved by pin 122 to tension the spring 121 in the manner already described. If the control handle remains in the position set for the first speed ratio, the clutch pedal may be moved as often as desired without affecting the position of the control member since the shifter fork is locked by arm 38 in its shifted position and the selectors are still connected to the shifter fork. This feature of my invention is a very important one since the gear ratio, after being engaged, cannot be disengaged and re-engaged each time that the clutch pedal is depressed. Thus the operator cannot disturb the condition of the transmission by clutching and declutching, thereby giving him the same control over the transmission as is present when an ordinary manual gear shifting lever is employed.

With the transmission in low speed position and the operator desires to place the transmission in another speed ratio, he may select the desired speed ratio whether it be second, third or reverse speed or he may even select neutral position if he so desires. The control mechanism imposes no restriction upon what may be accomplished by the operator relative to preselection of a future gear or neutral position. He may do everything that can be done with the usual and well known transmission which employs a manual gear shifting lever. If, for example, the operator desires to render second speed active, he moves the control handle and places pin 66 thereof into the recess marked 2. This operation rotates the two selectors so that detent 35 is disengaged from recess 49 and assumes a position wherein recess 47 is placed in longitudinally spaced relation with respect to detent 41. When detent 35 is disengaged from recess 49, it rides on the surface of finger 30 and disengages arm 38 from slot 40, thereby unlocking shifter fork 8.

The rotation of the selectors to the new position has no effect upon the position of the valve element 129 of the shut-off valve as projection 127 on the lever continues to ride on the cylindrical surface formed by the two selectors. After moving the control handle to second speed position, the clutch pedal may be subsequently depressed and the valve rod 91 moved to its upper position.

Since pin 110 of the valve rod is in alignment with slot 113 of sleeve 111, it will directly enter this slot and as a result thereof the rear end of the suction motor will be placed in communication with the manifold of the engine and the front end of the suction motor in communication with the atmosphere in a manner already described. As a result of this condition, the piston 86 will be moved from the front end of the suction motor cylinder to the rear end of the suction motor cylinder, completing a full stroke. This full stroke of the piston will first move the selectors to their inner position, the shifting fork 8 being carried with selector 22 as a result of ring 27 thereof engaging the hub of the shifter fork.

Since the recess 47 is in longitudinally spaced relation with detent 35, the detent will engage recess 47 when the selectors reach their inner position and as a result thereof, the shifter fork 9 will be connected to finger 29 of selector 23. As soon as the selectors reach their inner position, they will again be moved apart by the full stroke action of piston 86 and, as they move apart, selector 23 will carry shifter fork 9 to a position to render the second speed gear ratio of the transmission active. During the in and out movements of the selectors, arm 120, pivoted to the top of shaft 74, will be moved in a counter-clockwise direction, as viewed in Figure 4, and consequently spring 121 is tensioned.

When the clutch is permitted to re-engage by the release of the clutch pedal, valve rod 91 will be moved to its lower position and when it has assumed such position, the tension on lever 119 will cause the valve rod to return to the position indicated in Figure 4, arms 119 and 120 being adjacent each other as indicated by the dotted lines of the construction.

When shifter fork 9 reaches the position where the second speed ratio is active, arm 44, carried by detent 35, will snap into slot 45 of rod 6, thereby locking the shifting fork in its shifted position. Consequently, the mechanism cannot be moved until a new speed is selected regardless of whether the clutch pedal is actuated to move control rod 91 up or down.

If it is now desired to select a third or high speed ratio of the transmission, the control handle is moved to place pin 66 in the recess marked 3. This rotates the selectors and results in detent 35 riding out of recess 47 and up onto finger 24 and in longitudinally spaced relation with recess 49. Rotation of the selectors also unlocks the gear shifting fork from rod 6. By depressing the clutch pedal, valve rod 91 will be moved upwardly and into slot 112. This position of the control rod causes the front end of the cylinder of the suction motor to be placed in communication with the manifold and the rear end of the cylinder of the suction motor in communication with the atmosphere, thereby causing piston 86 to move from the rear end of the cylinder to the front end thereof. As a result of this movement, the selectors will be first moved to their inner position, whereby the gear shifting fork 9 will be returned to its neutral position by ring 31 of selector 23.

When the selectors reach their innermost position, detent 35 will snap into recess 49 and, as the selectors are moved apart by the continued movement of the piston, shifter fork 9 will be carried with selector 22 to thereby render the high speed ratio active. This high speed ratio position of the parts is clearly shown in Figures 4, 5 and 6. When shifter fork 9 reaches the high speed position, arm 44 of detent 41 engages slot 46 on rod 6, thereby locking the gear shifting fork in its shifted position. Coincidental with the movement of the piston from the rear to the front end, lever 119 of the levers pivoted to the top of shaft 74 will be moved in a clockwise direction to thereby tension spring 121. This position is shown in Figure 4.

When the clutch pedal is released, the valve rod will assume its lower position and, as soon as it is free of slot 112, spring 121 between levers 119 and 120 will cause the valve rod to be turned in a manner already apparent, thereby placing the valve rod in a position for causing the piston of the suction motor to be moved to the rear of the cylinder the next time that the valve rod is moved to the upper position and the shifting fork has been unlocked to permit the piston to move the mechanism.

When the mechanism is in a high speed position, any other speed ratio may be selected by moving the control handle in a manner already set forth. Either of the speeds or neutral may be selected at any time regardless of what speed ratio is active. If any of the speed ratios are active and it is desired at any time to neutralize the transmission and maintain it in neutral position, the control handle is moved to a position where pin 66 engages in the recess marked "N". As a result of this positioning of the control handle, the selectors will be rotated to a position where recess 48 is at the top of the selectors and in longitudinally spaced relation with respect to projection 127 on lever 125. Any detent which is in a recess will be moved out of said recess and caused to ride on the cylindrical surface formed by the selectors.

When the clutch pedal is depressed, the suction motor will be operated to move the selectors to their inner position, thereby moving any shifting fork which is in an active speed position to its neutral position. When the inner position of the selectors is reached, projection 127 on arm 125 will drop into recess 48, thereby locking the selectors in their inner position. Simultaneously with the locking of the selectors, element 129 of the shut-off valve will be moved to its lower position, whereby communication with conduit 98 will be cut off and said conduit connected to the atmosphere by way of passages 132 and 131.

With the selectors locked in their inner position and the source of suction cut off from the suction motor, subsequent operation of the clutch pedal and movement of the valve rod will have no effect upon the mechanism. It is thus seen that, when the control handle is moved to its neutral or end position and the clutch disengaged by the depression of the clutch pedal, the operator positively knows that the transmission is in neutral position and that he may safely leave the vehicle.

Referring to Figures 23 to 30, a slightly modified form will be described. Since substantially the major part of the structure shown is identical with that already described, it is believed only necessary to point out the structure which has been modified and its operation in conjunction with the structure already described. The main changes lie in the different form of clutch-controlled valve employed and different means for locking the selectors in their innermost position. The purpose of the modification is to disclose means which absolutely prevents the control handle from being moved to neutral position marked "N" unless the transmission has been previously placed in neutral position. By the use of such means, the operator will always know that when the control handle is in neutral, the transmission is also in neutral.

Figures 23, 24, 25, 26, 27, 28, 29:
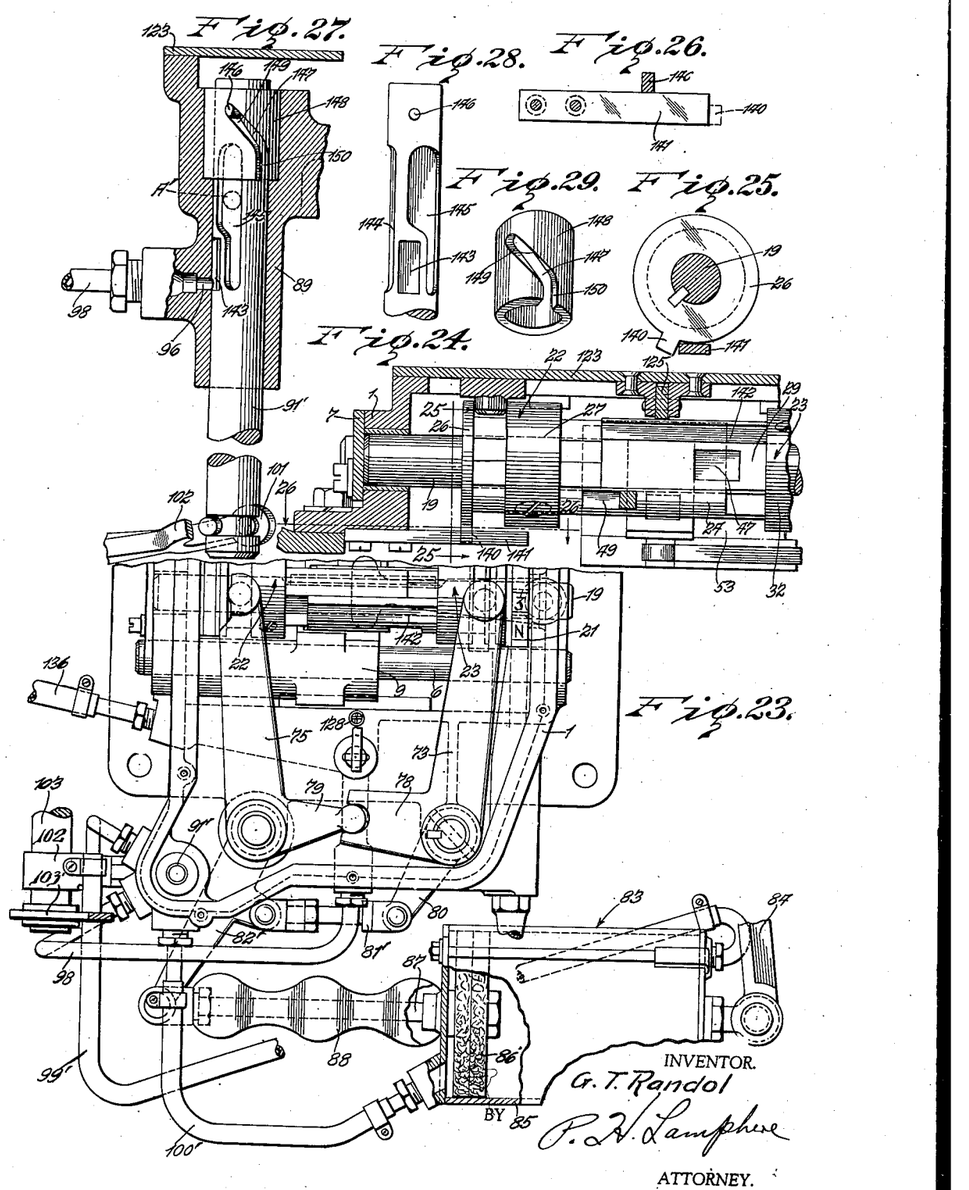
Figure 23 is a partial view of a modified control mechanism.
Figure 24 is a longitudinal cross-sectional view of the control mechanism of Figure 23, showing the rotatable selector in full.
Figures 25 and 26 are cross-sectional views taken on the lines 25—25 and 26—26 of Figure 24 showing details of the positive locking mechanism.
Figure 27 is a cross-sectional view of the control valve which is to be used with the modified control mechanism shown in Figure 23.
Figure 28 is the valve rod shown in Figure 27 as viewed from the left.
Figure 29 is a perspective view of the control sleeve for the valve rod shown in Figure 27.

Referring to the drawings, especially Figures 24, 25 and 26, ring 26 of selector 22 is provided with a projection 140. The casing 1 has detachably connected thereto a narrow plate 141 which extends beneath selector 22 and is of such length that the ring end 26 of selector 22 will lie just beyond the end of the plate when selector 22 is in its inner position. Projection 140 on ring 26 is so located that it will engage the edge 35 of the plate, as indicated in Figure 25, when the control handle is moved to a position to place pin 66 in the recess marked 3. Under these conditions the selectors cannot be rotated in a counter-clockwise position, as viewed in Figure 25, to thereby place the control handle in a position where pin 66 can engage the recess marked "N". However, if the selectors are moved to their inner position, projection 140 can clear the end of plate 141 and allow the control handle to be moved to the indicated neutral position. Under such a circumstance projection 140 will assume the position indicated by dotted lines in Figure 26.

Slot 48 in finger 29 of selector 23 has been slightly modified as shown at 142. This slot is of a length to extend throughout the entire length of the finger. The function of the slot, however, is the same since it cooperates with projection 127 on lever 125 when the selector is turned to place it at the top of the selectors. Under these conditions the lever may be pulled down by the spring to close the shut-off valve controlled by the valve element 129. Lever 125 does not need to act as a lock as this function is performed by projection 140 and plate 141.

Levers 73 and 75 for operating the selectors are interconnected by arms 78 and 79 in the same manner as already described. The arrangement of link 81' and its connection with arm 80 and lever 82' has been changed so as to eliminate the toggle action. With the structure shown, a full stroke of piston 86 of the suction motor is necessary to move the selectors either toward or away from each other.

Casing 89 of the clutch controlled valve and the parts therein are the same as in the previously described embodiment. In the modification under consideration conduit 99' leads to the rear end of cylinder 83 and conduit 100' leads to the front end of the cylinder.

In Figures 27, 28 and 29, the modified valve rod for controlling the suction motor is shown. Valve rod 91' is provided with a rectangular recess 143 similar to the prior recess 105 but of greater length. On each side of this recess are longitudinally extended recesses 144 and 145, recess 145 being slightly irregular and of such shape that a portion of it lies above recess 143. The upper end of the valve rod is provided with a pin 146, one end of which is adapted to cooperate with slot 147 on the fixed sleeve 148 which is substituted for the prior described sleeve 111. Slot 147 has an angular portion 149 and a straight vertical portion 150. Sleeve 109 and levers 119 and 120 of the prior described construction are eliminated in the construction under consideration as their function is no longer needed.

It is also to be noted that the means for locking the shifter forks in their shifted position has been eliminated and the construction shown in Figure 30 substituted therefor. The locking arms have been removed from the detents and a spring pressed ball employed for yieldably maintaining the shifting forks in the different positions they may assume. Referring in detail to Figure 30, wherein the relationship between shifter fork 8 and the selector is shown, the spring pressed detent 35' has been substituted for the previously described spring pressed detent 35. The spring pressed ball 151 is mounted in the shifting fork and cooperates with spaced rounded recesses 152 in rod 5 in a well known manner.

Referring to the operation of the modification shown in Figures 23 to 30, inclusive, the selectors are normally in their outer position and piston 86 of the suction motor is at the forward end of the cylinder. The position of the parts are as shown in Figure 23.

When the clutch pedal 103' is in clutch-engaged position, valve rod 91' will be in its lower position and rotated substantially 90 degrees from the position shown in Figure 27 as the result of the pin following the angular portion 149 of slot 147 as the valve rod is lowered. When the valve rod is in its lower position, the longitudinal recess 144 is in a position to place the rear end of the cylinder, through conduit 99' in communication with the atmosphere and recess 145 is in a position to place the front end of the cylinder in communication with the atmosphere through conduit 100'.

Assuming that the high speed ratio is active, as indicated in Figure 23, i. e., shifter fork 9 is moved to the forward position, and it is desired to place the transmission in neutral, the control handle cannot be moved to neutral position under these circumstances because projection 140 on ring 26 of selector 22 will abut plate 141 in the manner indicated in Figure 25. The transmission, however, is neutralized by depressing the clutch pedal, the first portion of its movement resulting in the disengagement of the clutch. Continued movement of the clutch pedal will bring the upper end of recess 143 in register with the ports connected to conduits 98 and 100'. Recess 144 will continue to be in register with the port connected to conduit 99' and, as a result thereof, the rear end of the suction motor will still be in communication with the atmosphere.

By connecting conduit 98 with conduit 100' through the upper end of recess 143, the front end of the cylinder of the suction motor will be placed in communication with the source of suction. Nothing will happen under these circumstances, however, since piston 86 is already at the forward end of the cylinder. Further depression of the pedal will continue to raise valve rod 91' and move pin 146 to the upper end of the inclined portion 149 of slot 147. As the result of this cooperation between the pin and the angular portion of the slot, the valve rod will be turned approximately 90 degrees as it is being raised.

When the pin reaches the upper end of the inclined slot, the valve rod will be in a position where the lower portion of recess 143 is adapted to connect conduit 98 with conduit 99', thus placing the rear end of cylinder 83 in communication with the source of suction. Under these circumstances the lower end of the longitudinal recess 145 is in a position to register with the port leading to conduit 100', thereby placing the forward end of the suction motor in communication with the atmosphere. Under these circumstances piston 86 will be free to be moved to the rear end of the cylinder, thereby causing levers 73 and 75 to be moved to their inner position carrying with them selectors 22 and 23. This action, as already pointed out, will move shifter fork 9 to its neutral position, thereby placing the transmission in neutral.

When the selectors have reached their inner position, the control handle may then be moved to a position wherein pin 66 can be placed in the recess marked "N" since now projection 140 on ring 26 of selector 22 is in a position where it will not engage plate 141. The position of projection 140, when the control handle is placed in neutral position, is shown by the dotted lines in Figure 26. When projection 140 assumes the dotted line position, the selectors will be locked in neutral position since projection 140 by its engagement with the end of plate 141 will not permit the selectors to be moved apart. When the selectors have been rotated to their neutral position, as indicated by the control handle, the longitudinal recess 142 in finger 29 will then lie beneath projection 127 of lever 125 and under these circumstances the shut-off valve, controlled by valve element 129, will be closed. Release of the clutch pedal and the lowering of valve rod 91' will have no effect upon the suction motor, notwithstanding the fact that the valve rod assumes a position during the lowering operation wherein the front end of the suction motor is connected to conduit 98 leading to the source of suction.

When it is again desired to place the transmission in any desired speed ratio, the control handle is moved to indicate that desired ratio. The movement of the control handle will result in the rotation of the selectors and the connecting of the selected shifting fork to the proper selector. As soon as the selectors have been rotated from neutral position, the shut-off valve will be opened by the movement of projection 127 of lever 125 out of recess 142. This will open the shut-off valve and again place conduit 98 in communication with the source of suction.

When the clutch pedal is now depressed to a point beyond where the clutch is disengaged, recess 143 will be placed in a position to connect the front end of the suction motor with conduit 98 and the rear end of the suction motor with the atmosphere. Piston 86 will now be moved to the front end of the cylinder, thereby spreading levers 73 and 75 apart and also the selectors. The movement of the selectors apart will result in the proper shifting fork being moved to a position to render active the speed ratio which had been previously selected. Under these circumstances it is not necessary to continue to depress the clutch pedal to move pin 146 in the inclined portion of slot 147 as such would result in the valve rod being so positioned that the rear end of the suction motor would be placed in communication with the source of suction and the front end of the suction motor would be placed in communication with the atmosphere, thereby moving the piston to the rear end of the suction motor and causing the gear which has been engaged to be neutralized. Of course, if such continued depression of the clutch pedal should be brought about, the gear which was neutralized by such action would be carried back into its active position when valve rod 91' was lowered by the release of the clutch pedal.

When the clutch has been fully re-engaged, the valve rod will again assume its lower position and piston 86 will be at the forward end of the cylinder, thus placing the selectors in their outer position and the properly selected gear ratio in its active position. With the selected speed ratio in its active position and it is desired to select another speed, the control handle is moved to the indicated speed ratio and thus places the selectors in a position to pick up the proper shifting fork when they assume the inner position.

When the clutch pedal is depressed, the valve rod will be raised and the forward end of the suction motor will be placed in communication with the source of suction but piston 86 will not be operated since it is already in its forward position. By moving the valve rod to its upper position, the rear end of the suction motor will be connected to the source of suction and the upper end of the motor to the atmosphere, thus moving the selectors to their inner position, thereby neutralizing the speed which has been active and connecting up the speed which has been selected in a manner already apparent from the description of the first described embodiment. The release of the clutch pedal and the consequent lowering of the valve rod again results in the front end of the suction motor being connected to the source of suction and the rear end of the suction motor to the atmosphere, thereby causing the selectors to be moved apart and the speed ratio which has been connected thereto can be rendered active.

By means of the modified structure described, it is readily seen that the operator cannot place the control handle in a position wherein pin 66 is in the neutral recess unless he has already neutralized the transmission. This is a very important feature since the operator will always know whether or not the transmission is in neutral position by merely glancing at the position of pin 66 of the control handle. Thus, if the pin is in the neutral recess, he knows that the transmission is in neutral and may leave the vehicle without any danger of the vehicle jumping forward or rearward when the clutch pedal has been released, thereby causing damage to another vehicle which may be near by. Also, after leaving the vehicle and coming back, the operator knows the exact condition of the transmission by merely looking at the control handle. If the control handle is not in the neutral position, he is immediately informed of the fact that a gear of the transmission is engaged or may be engaged and that before starting the engine of the vehicle, he should disengage the clutch by depressing the clutch pedal and, as a result thereof, the transmission will be immediately neutralized by the action of the suction motor when the engine is started.

Having fully described my invention, what I claim as new and desire to secure by Letters Patent of the United States is:

1. In a control mechanism for a change speed transmission having a plurality of speed ratios and shifting means therefor, the combination of a clutch pedal, means comprising a rotatable member and connecting means for selecting the shifting means for the different speed ratios, means for moving the rotatable member axially to thereby move the selected shifting means in one direction to render a selected speed ratio active and in the opposite direction to render said selected speed ratio neutral, means operable by movement of the clutch pedal for controlling said last named means, means for preventing the last named means from being operated by movement of the clutch pedal after it has moved the selected shifting means to the desired position, and means for disabling said preventing means by movement of the rotatable member of the selecting means to a position selecting another speed ratio.

2. In a control mechanism for a change speed transmission having a plurality of speed ratios and shifting means therefor, rotatable means for selecting neutral and the shifting means for the different speed ratios including means for connecting the selected shifting means to the rotatable means, means for moving the rotatable means axially to thereby move the selected shifting means in one direction to render a selected speed ratio active and in the opposite direction to render said selected speed ratio neutral, and means for preventing said last named means from moving the rotatable means axially when said shifting means is in a position rendering the speed ratio neutral and the selecting means is moved to a neutral position.

3. In a control mechanism for a change speed transmission having a plurality of speed ratios and shifting means therefor, rotatable means for selecting neutral and the shifting means for the different speed ratios including means for connecting the selected shifting means to the rotatable means, means for moving the rotatable means to thereby move the selected shifting means in one direction to render a selected speed ratio active and in the opposite direction to render said selected speed ratio neutral, and means for positively preventing the rotation of the selecting means to the neutral position prior to the shifting means being moved to a position rendering the speed ratio neutral, said last named means imposing no restriction on the free selection of the different speed ratios when they are either active or neutral.

4. In a control mechanism for a change speed transmission having a plurality of speed ratios and shifting means therefor, rotatable means for selecting neutral and the shifting means for the different speed ratios including means for connecting the selected shifting means to the rotatable means, means for moving the rotatable means axially to thereby move the selected shifting means in one direction to render a selected speed ratio active and in the opposite direction to render said selected speed ratio neutral, and means operable by the rotatable selecting means for disabling said last named means and preventing axial movement of the rotatable means when the selecting means is placed in neutral and the shifting means assumes a neutral position.

5. In a control mechanism for a change speed transmission having a plurality of speed ratios and shifting means therefor, means for selecting the shifting means for the different speed ratios, means for moving the selected shifting means in one direction to render a selected speed ratio active and in the opposite direction to render said selected speed ratio neutral, power means for operating said last named means, a control member for said power means, and means operable when the selecting means and the shifting means are in predetermined positions for disabling the power means independently of the control member.

6. In a control mechanism for a change speed transmission having a plurality of speed ratios and shifting means therefor, means for selecting the shifting means for the different speed ratios, means for moving the selected shifting means in one direction to render said selected speed ratio active and in the opposite direction to render said selected speed ratio neutral, fluid power means for operating said last named means, a valve for controlling said power means, and means operable when the selecting means and the shifting means are in predetermined positions for disabling the power means notwithstanding the position of the valve.

7. In a control mechanism for a change speed transmission having a plurality of speed ratios and shifting means therefor, means for selecting the shifting means for the different speed ratios, means for moving the selected shifting means in one direction to render said selected speed ratio active and in the opposite direction to render said selected speed ratio neutral, fluid power means for operating said last named means, a valve for controlling said power means, and a shut-off valve interposed between the control valve and the power means and operable when the selecting means and the shifting means are in predetermined positions for disabling the power means notwithstanding the position of the valve.

8. In a control mechanism for a change speed transmission having a plurality of speed ratios and shifting means therefor, a combined rotatable and longitudinally slidable member for selecting and shifting the shiftable means, means for moving said last named member longitudinally in opposite directions, and means operable by the rotation of the combined rotatable and longitudinally slidable member to a predetermined position for disabling the means for moving the combined rotatable and longitudinally slidable member in opposite directions.

9. In a control mechanism for a change speed transmission having a plurality of speed ratios and shifting means therefor, a combined rotatable and longitudinally slidable member for selecting and shifting the shiftable means, means for moving said last named member longitudinally in opposite directions, means for disabling the means for moving the combined rotatable and longitudinally slidable member in opposite directions, and a member cooperating with the combined rotatable and longitudinally slidable member and operable by the rotation thereof to a predetermined position for governing the disabling means.

10. In a control mechanism for a change speed transmission having a plurality of speed ratios and shifting means therefor, the combination with a clutch pedal, means comprising a rotatable member for selecting the desired shifting means, a fluid-operated device for shifting the selected shifting means in opposite directions, means for controlling the fluid-operated device by movement of the clutch pedal, and means operable by the rotation of the rotatable member of the selecting means to a predetermined position for preventing the movement of the clutch pedal from causing the fluid-operated device to function.

11. In a control mechanism for a change speed transmission having a plurality of speed ratios and shifting means therefor, means comprising a rotatable member for selecting the desired shifting means, means comprising a power-operated member for moving the rotatable member longitudinally to thereby shift the selected shifting means in opposite directions, and means operable by the rotation of the rotatable member of the selecting means to a predetermined position for disabling the power-operated member.

12. In a control mechanism for a change speed transmission having a plurality of speed ratios and shifting means therefor, means comprising a rotatable member for selecting the desired shifting means, means comprising a fluid motor and a control valve for shifting the selected shifting means in opposite directions, and a shut-off valve between the motor and the control valve and operable by the rotation of the rotatable member of the selecting means to a predetermined position for disabling the fluid motor.

13. In a control mechanism for a change speed transmission having shiftable means movable to two different positions for causing a speed ratio to be either active or neutral, means including an oscillating element for moving said shiftable means to its two different positions, a fluid motor comprising a cylinder and a piston connected to the oscillating element, said piston being positioned in said cylinder intermediate its ends when the oscillating element is in a position causing the shiftable means to be in neutral and at either end of the cylinder when the oscillating element is in a position causing the shifting means to render a speed ratio active, a valve for controlling the flow of fluid power to opposite ends of the cylinder, control means for moving said valve to a position to cause the piston to move to a predetermined end of the cylinder when the piston is positioned intermediate its extremities of travel, and means actuated by the piston during its movement to said end of the cylinder for moving the valve to a position to cause the piston to be moved to the other end of the cylinder upon a subsequent actuation of the control means.

14. In a control mechanism for a change speed transmission, a support, a supporting member, a shifting fork slidable on said supporting member, a rotatable and longitudinally slidable member for selecting and shifting said fork, yieldable means for connecting the last named member to the shifting fork, and means operable by said yieldable connecting means for locking the shifting fork to the support after it has been moved to a predetermined position.

15. In a control mechanism for a change speed transmission, a support, a supporting member, a shifting fork slidable on said supporting member, a rotatable and longitudinally slidable member for selecting and shifting said fork, yieldable means for connecting the last named member to the shifting fork, means operable by said yieldable connecting means for locking the shifting fork to the support after it has been moved to a predetermined position, and means operable by the rotation of the rotatable and slidable means for unlocking the shifting fork from the support.

16. In a control mechanism for a change speed gearing, a support, a longitudinally shiftable member, a rotatable and longitudinally slidable member, means for locking said shiftable member to the support, means for coupling and uncoupling said shiftable member and the rotatable and longitudinally slidable member by rotation of the latter, and interconnecting means between the locking and coupling means whereby the locking means may be moved to a non-locking position when the shiftable means and the rotatable and longitudinally slidable member are uncoupled.

17. In a control mechanism for a change speed transmission, a support, a rod carried by the support and provided with a recess, a shifting fork slidable on said rod, a rotatable and longitudinally slidable member for selecting and shifting said fork and provided with a recess, a spring-pressed detent carried by the fork and adapted to cooperate with the recess in the rotatable and slidable member when the latter is in a predetermined position, and an arm secured to the detent and movable therewith and adapted to cooperate with the recess in the rod when said detent is in its cooperating recess and the shifter fork is moved to a predetermined position by the rotatable and longitudinally slidable member.

18. In a control mechanism for a change speed transmission, a support, a longitudinally shiftable member for moving an element of the transmission, a combined rotatable and longitudinally slidable member for selecting and shifting the shiftable member, means carried by the shiftable member and cooperating with the support for positively locking the shiftable member in a predetermined position, and means operable by the rotation of the combined rotatable and longitudinally slidable member for unlocking said locking means.

19. In a control mechanism for a change speed gearing, a support, a longitudinally shiftable member carried by the support, a rotatable and longitudinally slidable member carried by the support, detent means carried by the support for engagement with the rotatable and longitudinally slidable member to thereby prevent longitudinal movement thereof when it is in a predetermined position, and means for disabling said detent means by rotation of the rotatable and longitudinally slidable member.

20. In a control mechanism for a change speed gearing, a support, a longitudinally shiftable member carried by the support, a rotatable and longitudinally slidable member carried by the support and provided with a recess, and a member pivoted on the support and adapted to engage said recess when the rotatable and longitudinally slidable member is in a predetermined position to thereby prevent said member from being moved longitudinally, said pivoted member being disengaged from the recess by a rotation of the rotatable and longitudinally slidable member.

21. In a control mechanism for a change speed transmission having a plurality of speed ratios and shifting means therefor, a combined rotatable and longitudinally slidable member for selecting and shifting the shiftable means, means for moving said last named means longitudinally in opposite directions, means for disabling the means for moving the combined rotatable and longitudinally slidable member in opposite directions, means cooperating with said member for preventing longitudinal movement thereof, and means for causing said disabling means and the last named means to be simultaneously operable when the member is in a predetermined rotative position.

22. In a control mechanism for a change speed transmission having a plurality of speed ratios and shifting means therefor, means comprising a rotatable member for selecting the desired shifting means, means comprising a power-operated member for moving the rotatable member longitudinally to thereby shift the selected shifting means in opposite directions, means for disabling the power-operated means, means cooperating with the rotatable member for preventing it from being moved longitudinally, and means for causing said last named means and the disabling means to be simultaneously operable when the rotatable member is in a predetermined rotative position.

23. In a control mechanism for a change speed transmission having a plurality of speed ratios and shifting means therefor, means comprising a rotatable member for selecting the desired shifting means, means comprising a fluid motor and a control valve for moving the selected shifting means in opposite directions, a shut-off valve between the motor and the control valve for disabling the fluid motor, and means cooperating with the rotatable member for locking it from movement in a longitudinal direction and for simultaneously permitting the shut-off valve to be operative when the rotatable member is in a predetermined rotative position.

24. In a control mechanism for a change speed transmission having a plurality of speed ratios and shifting means therefor, means comprising a rotatable member for selecting the desired shifting means, said member being provided with a longitudinal recess, means comprising a fluid motor and a control valve for moving the selected shifting means in opposite directions, a shut-off valve between the motor and the control valve for disabling the fluid motor, and a member cooperating with the recess in the rotatable member when said member is in a predetermined rotative position for causing said shut-off valve to be operative, said recess being of sufficient length to permit the rotatable member to be shifted longitudinally during the shifting operation.

25. In a control mechanism for a change speed transmission having a plurality of speed ratios and shifting means therefor, rotatable means for selecting the shifting means for the different speed ratios, means for moving the rotatable means longitudinally in one direction to render a selected speed ratio active and in the opposite direction to render said selected speed ratio neutral, a fluid motor for operating said last named means, a control valve for the fluid motor, the movable element of the motor being so controlled by the valve that it is movable from either of the extreme positions of its travel to the center of its travel to cause the speed ratios to be inactive and movable from the center of travel to its extremities to cause said speed ratios to be active, and means controlled by the selecting means when in a predetermined position for disabling the fluid motor when the movable element thereof assumes a central position in its path of travel.

26. In a control mechanism for a change speed transmission having a plurality of speed ratios and shifting means therefor, the combination of a clutch pedal, means for selecting the shifting means for the different speed ratios, means for moving the selected shifting means in one direction to render a selected speed ratio active and in the opposite direction to render said selected speed ratio neutral, a fluid motor for operating said last named means, the movable element of the motor being movable from one of the extreme positions of its travel to the center of its travel to cause an active speed ratio to be inactive and movable from its center of travel to one of its extremities to cause said speed ratio to be active, a control valve for the fluid motor, and means for operating the valve by the clutch pedal, said valve being so associated and coordinated with the fluid motor and clutch pedal that movement of the clutch pedal beyond clutch-disengaged position causes the valve to connect the source of fluid pressure with the fluid motor in such a manner that the movable element thereof will move to its central position if it is not in such position and when the pedal is returned to clutch-engaged position it causes the valve to connect the motor with the source of pressure in such a manner that the movable element thereof will move to one of its extremities of travel.

27. In a control mechanism for a change speed transmission having a plurality of speed ratios and shifting means therefor, the combination of a clutch pedal, means for selecting the shifting means for the different speed ratios, means for moving the selected shifting means in one direction to render a selected speed ratio active and in the opposite direction to render said selected speed ratio neutral, a fluid motor for operating said last named means, the movable element of the motor being movable from one of its extreme positions of travel to its other extreme position of travel to cause an active speed ratio to be inactive and movable in the reverse direction to cause said speed ratio to be active, a control valve for the fluid motor, and means for operating the valve by the clutch pedal, said valve being so designed and associated with the fluid motor and the clutch pedal that movement of the pedal to a point beyond its clutch-disengaged position causes the valve to connect the source of fluid pressure with the fluid motor in such a manner that the movable element thereof will be moved to one of its extremities of travel and movement of the clutch pedal to a farther point will cause the valve to connect the source of fluid pressure with the fluid motor in such a manner that the movable element thereof will be moved in a reverse direction.

28. In a control mechanism for a change speed transmission having a plurality of speed ratios and shifting means therefor, rotatable means for selecting neutral and the shifting means for the different speed ratios, manual means including a lever for rotating the rotatable means, means for moving the rotatable means longitudinally in one direction to render a selected speed ratio active and in the opposite direction to render said selected speed ratio neutral, and stop means cooperating with the rotatable means when it is in a position causing a speed ratio to be active for preventing the rotatable means from being rotated by the lever to the neutral position but not to other positions corresponding to other speed ratios, said stop means being ineffective when the rotatable means is moved by the moving means to a position to neutralize the speed ratio.

29. In control mechanism for a change speed transmission having a plurality of sets of gears and shifting means for causing each set to be operative or inoperative, a combined rotatable and axially movable member, means for connecting the different sets of gears to the rotatable member, means for moving said rotatable member axially in one direction to a position rendering a set of gears active and in the opposite direction to a position rendering said set of gears neutral, a fixed member, and a cooperating member carried by the rotatable member and engageable with the fixed member only when said rotatable member is in an axial position causing a set of gears to be active to thereby prevent rotation of the said rotatable member to a position where said rotatable member will not be capable of being connected to any of the shifting means.

GLENN T. RANDOL.